(12) United States Patent
Quanci et al.

(10) Patent No.: US 11,845,897 B2
(45) Date of Patent: Dec. 19, 2023

(54) HEAT RECOVERY OVEN FOUNDATION

(71) Applicant: SUNCOKE TECHNOLOGY AND DEVELOPMENT LLC, Lisle, IL (US)

(72) Inventors: John Francis Quanci, Haddonfield, NJ (US); Chun Wai Choi, Chicago, IL (US); Mark Anthony Ball, Richards, VA (US); Jason Crum, Lisle, IL (US); Milos J. Kaplarevic, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 17/584,672

(22) Filed: Jan. 26, 2022

(65) Prior Publication Data
US 2022/0251452 A1    Aug. 11, 2022

Related U.S. Application Data

(62) Division of application No. 16/729,212, filed on Dec. 27, 2019, now Pat. No. 11,261,381.

(60) Provisional application No. 62/786,320, filed on Dec. 28, 2018.

(51) Int. Cl.
| | | |
|---|---|---|
| *C10B 15/02* | (2006.01) | |
| *C10B 29/08* | (2006.01) | |
| *C10B 41/00* | (2006.01) | |
| *C10B 21/20* | (2006.01) | |

(52) U.S. Cl.
CPC .............. *C10B 15/02* (2013.01); *C10B 21/20* (2013.01); *C10B 29/08* (2013.01); *C10B 41/00* (2013.01)

(58) Field of Classification Search
CPC ......... C10B 15/02; C10B 21/20; C10B 29/08; C10B 41/00
See application file for complete search history.

(56) References Cited

U.S. PATENT DOCUMENTS

| | | | |
|---|---|---|---|
| 425,797 | A | 4/1890 | Hunt |
| 469,868 | A | 3/1892 | Osbourn |
| 760,372 | A | 5/1904 | Beam |
| 845,719 | A | 2/1907 | Schniewind |
| 875,989 | A | 1/1908 | Garner |
| 976,580 | A | 7/1909 | Krause |
| 1,140,798 | A | 5/1915 | Carpenter |

(Continued)

FOREIGN PATENT DOCUMENTS

| | | |
|---|---|---|
| CA | 1172895 | 8/1984 |
| CA | 2775992 | 5/2011 |

(Continued)

OTHER PUBLICATIONS

U.S. Appl. No. 07/587,742, filed Sep. 25, 1990, now U.S. Pat. No. 5,114,542, titled Nonrecovery Coke Oven Battery and Method of Operation.

(Continued)

*Primary Examiner* — Renee Robinson
(74) *Attorney, Agent, or Firm* — Perkins Coie LLP

(57) ABSTRACT

A coke oven includes an oven chamber configured to support and heat a coal bed, a castable slab below the oven chamber, and a foundation supporting the heat recovery oven. One or more beams are positioned between the castable slab and the foundation. The beams extend from a first end of the oven chamber to a second end of the oven chamber, forming a plurality of air gaps between the castable slab and the foundation. Heat from the oven chamber is dissipated by the one or more beams.

14 Claims, 13 Drawing Sheets

(56) References Cited

U.S. PATENT DOCUMENTS

| | | |
|---|---|---|
| 1,424,777 A | 8/1922 | Schondeling |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Smith |
| 2,667,185 A | 1/1954 | Beavers |
| 2,723,725 A | 11/1955 | Keiffer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,015,893 A | 1/1962 | McCreary |
| 3,026,715 A | 3/1962 | Briggs |
| 3,033,764 A | 5/1962 | Hannes |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson, Jr. |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,462,345 A | 8/1969 | Kernan |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobie et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shortell et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |

(56) References Cited

U.S. PATENT DOCUMENTS

| | | |
|---|---|---|
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |

(56) References Cited

U.S. PATENT DOCUMENTS

| | | |
|---|---|---|
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,526,541 B2 | 1/2020 | West et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Cella et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 1,378,782 A1 | 5/2021 | Floyd |
| 11,008,517 B2 | 5/2021 | Chun et al. |
| 11,008,518 B2 | 5/2021 | Quanci et al. |
| 11,021,655 B2 | 6/2021 | Quanci et al. |
| 11,053,444 B2 | 7/2021 | Quanci et al. |
| 11,071,935 B2 | 7/2021 | Quanci et al. |
| 11,098,252 B2 | 8/2021 | Quanci et al. |
| 11,117,087 B2 | 9/2021 | Quanci |
| 11,142,699 B2 | 10/2021 | West et al. |
| 11,186,778 B2 | 11/2021 | Crum et al. |
| 11,193,069 B2 | 12/2021 | Quanci et al. |
| 11,214,739 B2 | 1/2022 | Quanci et al. |
| 11,261,381 B2 | 3/2022 | Quanci et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamine et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0156584 A1 | 6/2014 | Motukuri et al. |
| 2014/0182683 A1 | 7/2014 | Quanci et al. |
| 2014/0208997 A1 | 7/2014 | Alferyev et al. |
| 2014/0224123 A1 | 8/2014 | Walters |
| 2014/0262726 A1 | 9/2014 | West et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0219530 A1 | 8/2015 | Li et al. |
| 2015/0226499 A1 | 8/2015 | Mikkelsen |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0319198 A1 | 11/2016 | Quanci et al. |
| 2017/0182447 A1 | 6/2017 | Sappok et al. |
| 2017/0183569 A1 | 6/2017 | Quanci et al. |
| 2017/0226425 A1 | 8/2017 | Kim et al. |

(56) References Cited

U.S. PATENT DOCUMENTS

| | | |
|---|---|---|
| 2017/0261417 A1 | 9/2017 | Zhang |
| 2017/0313943 A1 | 11/2017 | Valdevies |
| 2017/0352243 A1 | 12/2017 | Quanci et al. |
| 2018/0340122 A1 | 11/2018 | Crum et al. |
| 2019/0169503 A1 | 6/2019 | Chun et al. |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2020/0206683 A1 | 7/2020 | Quanci et al. |
| 2020/0208059 A1 | 7/2020 | Quanci et al. |
| 2020/0208060 A1 | 7/2020 | Quanci et al. |
| 2020/0208063 A1 | 7/2020 | Quanci et al. |
| 2020/0208833 A1 | 7/2020 | Quanci et al. |
| 2020/0407641 A1 | 12/2020 | Quanci et al. |
| 2021/0024828 A1 | 1/2021 | Ball et al. |
| 2021/0040391 A1 | 2/2021 | Quanci et al. |
| 2021/0130697 A1 | 5/2021 | Quanci et al. |
| 2021/0163821 A1 | 6/2021 | Quanci et al. |
| 2021/0163822 A1 | 6/2021 | Quanci et al. |
| 2021/0163823 A1 | 6/2021 | Quanci et al. |
| 2021/0198579 A1 | 7/2021 | Quanci et al. |
| 2021/0340454 A1 | 11/2021 | Quanci et al. |
| 2021/0363426 A1 | 11/2021 | West et al. |
| 2021/0363427 A1 | 11/2021 | Quanci et al. |
| 2021/0371752 A1 | 12/2021 | Quanci et al. |
| 2021/0388270 A1 | 12/2021 | Choi et al. |
| 2022/0056342 A1 | 2/2022 | Quanci et al. |
| 2022/0106527 A1 | 4/2022 | Quanci et al. |
| 2022/0195303 A1 | 6/2022 | Quanci et al. |
| 2022/0204858 A1 | 6/2022 | West et al. |
| 2022/0204859 A1 | 6/2022 | Crum et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 105137947 A | 12/2015 |
| CN | 105189704 A | 12/2015 |
| CN | 105264448 A | 1/2016 |
| CN | 105467949 A | 4/2016 |
| CN | 106661456 A | 5/2017 |
| CN | 106687564 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 A1 | 1/1987 |
| EP | 0903393 A2 | 3/1999 |
| EP | 1538503 A1 | 6/2005 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |

(56) References Cited

FOREIGN PATENT DOCUMENTS

| | | |
|---|---|---|
| JP | 08127778 | 5/1996 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016086322 | 6/2016 |

OTHER PUBLICATIONS

U.S. Appl. No. 07/878,904, filed May 6, 1992, now U.S. Pat. No. 5,318,671, titled Method of Operation of Nonrecovery Coke Oven Battery.

U.S. Appl. No. 09/783,195, filed Feb. 14, 2001, now U.S. Pat. No. 6,596,128, titled Coke Oven Flus Gas Sharing.

U.S. Appl. No. 07/886,804, filed May 22, 1992, now U.S. Pat. No. 5,228,955, titled High Strength Coke Oven Wall Having Gas Flues Therin.

U.S. Appl. No. 08/059,673, filed May 12, 1993, now U.S. Pat. No. 5,447,606, titled Method of and Apparatus for Capturing Coke Oven Charging Emissions.

U.S. Appl. No. 08/914,140, filed Aug. 19, 1997, now U.S. Pat. No. 5,928,476, titled Nonrecovery Coke Oven Door.

U.S. Appl. No. 09/680,187, filed Oct. 5, 2000, now U.S. Pat. No. 6,290,494, titled Method and Apparatus for Coal Coking.

U.S. Appl. No. 10/933,866, filed Sep. 3, 2004, now U.S. Pat. No. 7,331,298, titled Coke Oven Rotary Wedge Door Latch.

U.S. Appl. No. 11/424,566, filed Jun. 16, 2006, now U.S. Pat. No. 7,497,930, titled Method and Apparatus for Compacting Coal for a Coal Coking Process.

U.S. Appl. No. 12/405,269, filed Mar. 17, 2009, now U.S. Pat. No. 7,998,316, titled Flat Push Coke Wet Quenching Apparatus and Process.

U.S. Appl. No. 13/205,960, filed Aug. 9, 2011, now U.S. Pat. No. 9,321,965, titled Flat Push Coke Wet Quenching Apparatus and Process.

U.S. Appl. No. 11/367,236, filed Mar. 3, 2006, now U.S. Pat. No. 8,152,970, titled Method and Apparatus for Producing Coke.

U.S. Appl. No. 12/403,391, filed Mar. 13, 2009, now U.S. Pat. No. 8,172,930, titled Cleanable In Situ Spark Arrestor.

U.S. Appl. No. 12/849,192, filed Aug. 3, 2010, now U.S. Pat. No. 9,200,225, titled Method and Apparatus for Compacting Coal for a Coal Coking Process.

U.S. Appl. No. 13/631,215, filed Sep. 28, 2012, now U.S. Pat. No. 9,683,740, titled Methods for Handling Coal Processing Emissions and Associated Systems and Devices.

U.S. Appl. No. 13/730,692, filed Dec. 28, 2012, now U.S. Pat. No. 9,193,913, titled Reduced Output Rate Coke Oven Operation With Gas Sharing Providing Extended Process Cycle.

U.S. Appl. No. 14/921,723, filed Oct. 23, 2015, titled Reduced Output Rate Coke Oven Operation With Gas Sharing Providing Extended Process Cycle.

U.S. Appl. No. 14/655,204, now U.S. Pat. No. 10,016,714, filed Jun. 24, 2015, titled Systems and Methods for Removing Mercury From Emissions.

U.S. Appl. No. 16/000,516, now U.S. Pat. No. 11,117,087, filed Jun. 5, 2018, titled Systems and Methods for Removing Mercury From Emissions.

U.S. Appl. No. 17/459,380, filed Jun. 5, 2018, titled Systems and Methods for Removing Mercury From Emissions.

(56) References Cited

OTHER PUBLICATIONS

U.S. Appl. No. 13/830,971, filed Mar. 14, 2013, now U.S. Pat. No. 10/047,296, titled Non-Perpendicular Connections Between Coke Oven Uptakes and a Hot Common Tunnel, and Associated Systems and Methods, now U.S. Pat. No. 10/047,295.
U.S. Appl. No. 16/026,363, filed Jul. 3, 2018, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No. 9,273,249, titled Systems and Methods for controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 17/471,491, filed Sep. 10, 2021, now U.S. Pat. No. 11,142,699, titled Vent Stack Lids Associated Systems and Methods.
U.S. Appl. No. 13/843,166, now U.S. Pat. No. 9,273,250, filed Mar. 15, 2013, titled Methods and Systems for Improved Quench Tower Design.
U.S. Appl. No. 15/014,547, filed Feb. 3, 2016, now U.S. Pat. No. 10,927,303, titled Methods for Improved Quench Tower Design.
U.S. Appl. No. 17/155,818, filed Jan. 22, 2021, titled Methods and Systems for Improved Quench Tower Design.
U.S. Appl. No. 14/655,003, filed Jun. 23, 2015, titled Systems and Methods for Maintaining a Hot Car in a Coke Plant.
U.S. Appl. No. 16/897,957, filed Jun. 10, 2020, titled Systems and Methods for Maintaining a Hot Car in a Coke Plant.
U.S. Appl. No. 13/829,588, now U.S. Pat. No. 9,193,915, filed Mar. 14, 2013, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10/968,383, titled Coke Ovens Having Monolith Component Construction.
U.S. Appl. No. 16/704,689, filed Dec. 5, 2019, titled Horizontal Heat Recovery Coke Ovens Having Monolith Crowns.
U.S. Appl. No. 17/190,720, filed Mar. 3, 2021, titled Coke Ovens Having Monolith Component Construction.
U.S. Appl. No. 13/589,009, filed Aug. 17, 2021, titled Automatic Draft Control System for Coke Plants.
U.S. Appl. No. 15/139,568, filed Aug. 27, 2016, now U.S. Pat. No. 10,947,455, titled Automatic Draft Control System for Coke Plants.
U.S. Appl. No. 17/176,391, filed Feb. 16, 2021, titled Automatic Draft Control System for Coke Plants.
U.S. Appl. No. 13/588,996, now U.S. Pat. No. 9,243,186, filed Aug. 17, 2012, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing, now U.S. Pat. No. 10,041,002.
U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, titled Coke Plant Including Exhaust Gas Sharing.
U.S. Appl. No. 13/589,004, now U.S. Pat. No. 9,249,357, filed Aug. 17, 2012, titled Method and Apparatus for Volatile Matter Sharing in Stamp-Charged Coke Ovens.
U.S. Appl. No. 13/730,673, filed Dec. 28, 2012, titled Exhaust Flow Modifier, Duct Intersection Incorporating The Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed Mar. 3, 3021, titled Exhaust Flow Modifier, Duck Intersection Incorporating the Same, and Methods Therefor.
U.S. Appl. No. 13/598,394, now U.S. Pat. No. 9,169,439, filed Aug. 29, 2012, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, titled Coke Oven Charging System.
U.S. Appl. No. 15/443,246, now U.S. Pat. No. 9,976,089, filed Feb. 27, 2017, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi-Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 17/363,701, filed Jun. 30, 2021, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. No. 10,920,148, titled Improved Burn Profiles for Coke Operations.
U.S. Appl. No. 17/155,219, filed Jan. 22, 2021, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, now U.S. Pat. No. 11,214,739, filed Jan. 6, 2020, titled Method and System for Dynamically Charging a Coke Oven.
U.S. Appl. No. 17/526,477, filed Jan. 6, 2020, titled Method and System for Dynamically Charging a Coke Oven.
U.S. Appl. No. 15/614,525, filed Jun. 5, 2017, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, now U.S. Pat. No. 11,186,778, titled System and Method for Repairing a Coke Oven.

(56) References Cited

OTHER PUBLICATIONS

U.S. Appl. No. 17/521,061, filed Nov. 8, 2021, titled System and Method for Repairing a Coke Oven.
U.S. Appl. No. 17/135,483, filed Dec. 28, 2020, titled Oven Health Optimization Systems and Methods.
U.S. Appl. No. 16/729,053, filed Dec. 27, 2019, titled Oven Uptakes.
U.S. Appl. No. 16/729,036, filed Dec. 27, 2019, now U.S. Pat. No. 11,365,355, titled Systems and Methods for Treating a Surface of a Coke Plant.
U.S. Appl. No. 17/747,708, filed May 18, 2022, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, titled Methods and Systems for Providing Corrosion Resistant Surfaces in Contaminant Treatment Systems.
U.S. Appl. No. 16/729,068, filed Dec. 27, 2019, titled Systems and Methods for Untilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, titled Coke Plant Tunnel Repair and Flexible Joints.
U.S. Appl. No. 16/729,170, now U.S. Pat. No. 11/193,069, filed Dec. 27, 2019, titled Coke Plant Tunnel Repair and Anchor Distribution.
U.S. Appl. No. 17/532,058, filed Nov. 22, 2021, titled Coke Plant Tunnel Repair and Anchor Distribution.
U.S. Appl. No. 16/729,157, filed Dec. 27, 2019, now U.S. Pat. No. 11,071,935, titled Particulate Dectection for Industrial Facilities, and Associated Systems and Methods.
U.S. Appl. No. 16/729,057, filed Dec. 27, 2019, now U.S. Pat. No. 11/021,655, titled Decarbonization of Coke Ovens and Associated Systems and Methods.
U.S. Appl. No. 17/321,857, filed May 17, 2021, titled Decarbonization of Coke Ovens and Associated systems and Methods.
U.S. Appl. No. 16/729,212, filed Dec. 27, 2019, now U.S. Pat. No. 11,261,381, titled Heat Recovery Oven Foundation.
U.S. Appl. No. 16/729,219, now U.S. Pat. No. 11,098,252, filed Dec. 27, 2019, titled Spring-Loaded Heat Recovery Oven System and Method.
referenced matters as well as, for example, electronic copies of corresponding applications, drawings, and pending claims, and their complete file histories. the.
histories for the above-referenced matters. However, if the Examiner cannot readily access these complete file histories, or would like the Applicant to provide such copies, please contact the attorney below who would be pleased to provide any portion of these complete file histories upon request.
Or is considered to be, material to patentability. in addition, Applicant does not admit that.
U.S. Appl. No. 17/459,380, filed Aug. 27, 2021, Quanci et al.
U.S. Appl. No. 17/526,477, filed Nov. 15, 2021, Quanci et al.
U.S. Appl. No. 17/532,058, filed Nov. 22, 2021, Quanci et al.
U.S. Appl. No. 17/736,960, filed May 4, 2022, Quanci et al.
U.S. Appl. No. 17/747,708, filed May 18, 2022, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.

Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1 —24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.

(56) References Cited

OTHER PUBLICATIONS

"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.

Yu et al., "Coke Oven Production Technology," Lianoning Science and Technology Press, first edition, Apr. 2014, pp. 356-358.

"Resources and Utilization of Coking Coal in China," Mingxin Shen ed., Chemical Industry Press, first edition, Jan. 2007, pp. 242-243, 247.

International Search Report and Written Opinion for PCT/US2019/068828; dated Apr. 29, 2020; 9 pages.

- Conduction: Sole Flue Temperature 2200F; Groundwater Temperature 50F
- Radiation : surface to surface; 0.9 emissivity; ambient temperature 120F
- Convection: film coefficient 3.3125e-006 Btu/s*in^2*F; ambient temperature 120F

- Conduction: Sole Flue Temperature 2200F; Groundwater Temperature 50F
- Radiation : surface to surface; 0.9 emissivity; ambient temperature 300F near I beams
- Convection suppressed-no wind

- Conduction: Sole Flue Temperature 2200F; Groundwater Temperature 50F
- Radiation: surface to surface; 0.9 emissivity; ambient temperature 120F
- Convection: film coefficient 1.199e-005 Btu/s*in^2*F; ambient temperature 120F

- Conduction: Sole Flue Temperature 2200F; Groundwater Temperature 50F
- Radiation: surface to surface; 0.9 emissivity; ambient temperature 120F (near hole 400F)
- Convection: film coefficient 1.199e-005 Btu/s*in^2*F; ambient temp. 120F (near hole 400F)

HEAT RECOVERY OVEN FOUNDATION

CROSS-REFERENCE TO RELATED APPLICATION

This application is a divisional of U.S. patent application Ser. No. 16/729,212, filed Dec. 27, 2019, which claims the benefit of U.S. Provisional Patent Application No. 62/786,320, filed Dec. 28, 2018, the disclosures of which are incorporated herein by reference in their entireties.

TECHNICAL FIELD

This disclosure relates to foundations for heat recovery ovens.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for approximately forty-eight hours under closely-controlled atmospheric conditions. Coking ovens have been used for many years to convert coal into metallurgical coke. During the coking process, finely crushed coal is heated under controlled temperature conditions to devolatilize the coal and form a fused mass of coke having a predetermined porosity and strength. Because the production of coke is a batch process, multiple coke ovens are operated simultaneously.

In order to convert coal into metallurgical coke, coking ovens must be heated to very high temperatures typically exceeding 2000° F. The ovens are often manufactured out of refractory brick that can withstand these temperatures. However, structural components of the ovens' foundations cannot withstand these temperatures. Concrete, for example, can undergo mechanical changes above about 600° F. that increase the likelihood of failure of the concrete. If the temperature of the foundation or the subgrade underlying the foundation is too high, the structure of the foundation and ovens may fail.

DETAILED DESCRIPTION

Figure 1A:
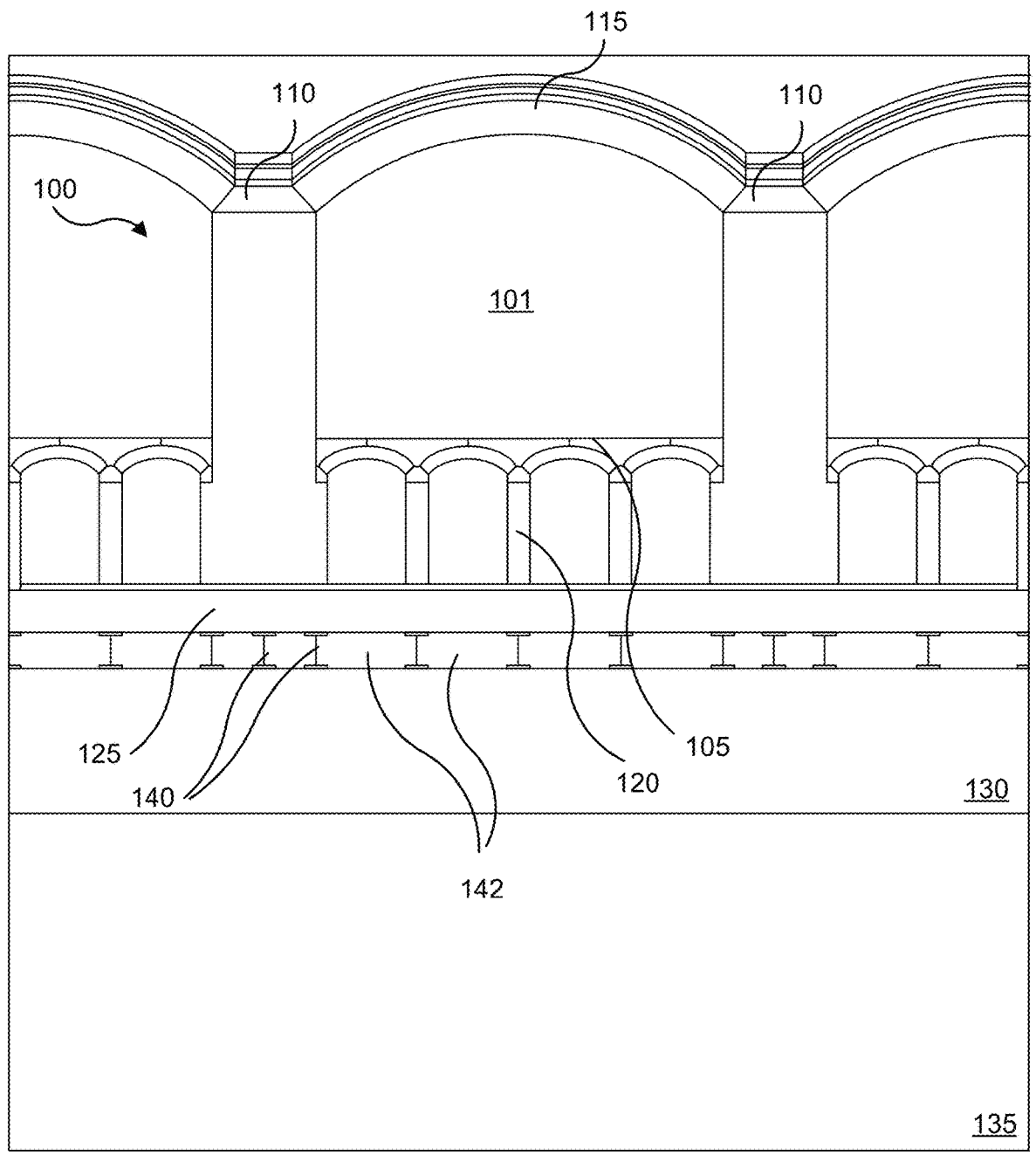
FIG. 1A is a cross-section view of a coke oven, according to one embodiment.

The present technology is generally directed to foundations for coke ovens, such as heat recovery ovens, byproduct ovens, or other types of coke ovens. In some embodiments, a coke oven can include an oven chamber configured to support and heat a coal bed, a castable slab below the oven chamber, and a foundation supporting the heat recovery oven. One or more beams can be positioned between the castable slab and the foundation. The one or more beams can extend from a first end of the oven chamber to a second end, and can form a plurality of air gaps between the castable slab and the foundation. Heat from the oven chamber can be dissipated by the air gaps between the one or more beams.

In some embodiments, a coke oven comprises an oven body configured to heat a coal bed, a foundation supporting the oven body, and a plurality of beams positioned between the oven body and the foundation. The beams thermally isolate the oven body from the foundation.

In some embodiments, a method for operating a coke oven comprises providing a heat recovery oven that includes an oven chamber configured to heat a coal bed, a foundation supporting the oven chamber and separated from the oven chamber by one or more air gaps, and a forced cooling system configured to force a fluid through an air gap of the one or more air gaps. The method can further include heating the coal bed in the oven chamber. Responsive to determining a temperature at a limiting material of the heat recovery oven exceeds a temperature limit for the limiting material while heating the coal bed in the oven chamber, the method can further include activating the forced cooling system to force the fluid through the air gap.

The air gaps between the beams described herein beneficially dissipate heat produced during the coking process, reducing an amount of heat transferred into a foundation and subgrade supporting the coke oven. The reduced temperature decreases the likelihood of failure of the structural components of the oven. The beams also have lower cost and faster installation than conventional block foundations, and the beams can be more easily replaced if they are damaged. Furthermore, visual inspection of the beams is easier than other foundations, and, because failure of a beam may indicate failure of other structural components, the beams may serve as a visual indicator of the integrity of the oven's support structure.

Specific details of several embodiments of the technology are described below with reference to FIGS. 1-6. Other details describing well-known structures and systems often associated with coke ovens have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-6.

Figure 1B:
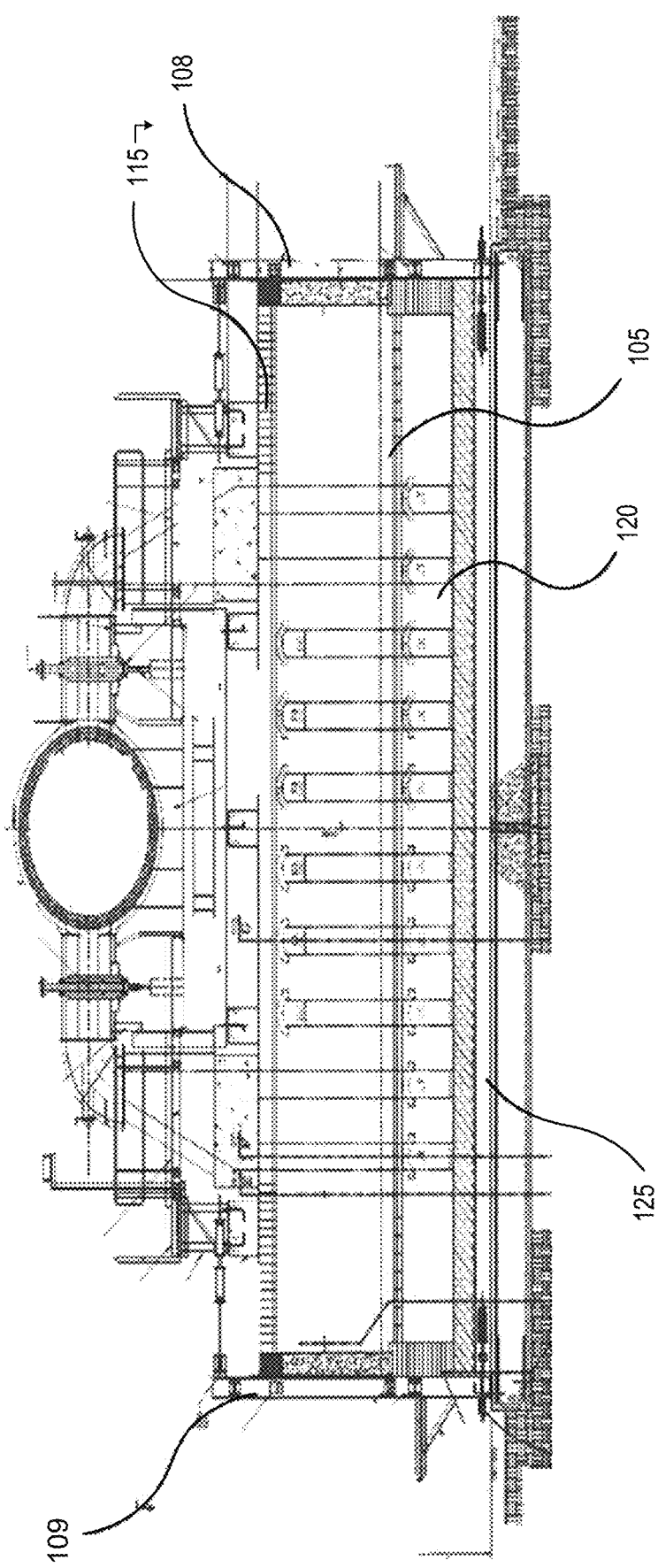
FIG. 1B is a side view of a coke oven.

FIG. 1A is a cross-sectional view of a coke oven 100 in accordance with embodiments of the disclosure, and FIG. 1B is a side view of the oven 100. Various embodiments of the coke oven 100 described herein are implemented in a heat recovery oven. However, the coke oven 100 can be any type of coke oven. As shown in FIGS. 1A-1B, the coke oven 100 can include an open cavity (referred to herein as an oven chamber 101) defined by a floor 105, two sidewalls 110 extending upwardly from the oven floor 105, and a crown 115 that forms a top surface of the open cavity. A first end of the crown 115 can rest on a first sidewall 110 while a second end of the crown 115 can rest on an opposing, second sidewall 110. The oven can have a front door 108 and a rear door 109, which can be closed to seal the oven chamber 101. The oven 100 can be adjacent to other similar ovens. For example, FIG. 1A shows portions of ovens adjacent to the oven 100. Each adjacent oven can share a common sidewall 110 with the oven 100.

In operation, volatile gases emitted from heated coal in the oven 100 collect in the crown 115 and are drawn downstream into a sole flue 120 positioned beneath the oven floor 105. The sole flue 120 includes a plurality of side-by-side runs that form a circuitous path beneath the oven floor 105. Although the sole flue 120 runs are illustrated as being open in the cross-section of FIG. 1A, front and backside walls of the sole flue 120 can be enclosed.

Coke is produced in the oven 100 by first loading coal into the oven chamber 101, heating the coal in an oxygen-depleted environment, driving off the volatile fraction of coal, and then oxidizing the volatile matter within the oven 100 to capture and utilize the heat given off. The coking cycle begins when coal is charged onto the oven floor 105 through the front door 108. The coal on the oven floor 105 is known as the coal bed. Heat from the oven 100, due to the previous coking cycle, starts a carbonization cycle. Roughly half of the total heat transfer to the coal bed is radiated down onto the top surface of the coal bed from the luminous flame of the coal bed and the crown 115. The remaining approximately half of the heat is transferred to the coal bed by conduction from the oven floor 105, which is convectively heated from the volatilization of gases in the sole flue 120. In this way, a carbonization process "wave" of plastic flow of the coal particles and formation of high strength cohesive coke proceeds from both the top and bottom boundaries of the coal bed. At the end of the coking cycle, the coal has coked out and has carbonized to produce coke. The coke can be removed from the oven 100 through a rear door opposite the front door using a mechanical extraction system. Finally, the coke is quenched and sized before delivery to a user.

Primary air for combustion can be added to the oven chamber 101 to partially oxidize coal volatiles, but the amount of primary air can be controlled so that only a portion of the volatiles released from the coal are combusted in the oven chamber 101, thereby releasing only a fraction of their enthalpy of combustion within the oven chamber 101. The partially combusted gases pass from the oven chamber 101 into the sole flue 120, where secondary air can be added to the partially combusted gases. As the secondary air is introduced, the partially combusted gases are more fully combusted in the sole flue 120, thereby extracting the remaining enthalpy of combustion that can be conveyed through the oven floor 105 to add heat to the oven chamber 101. However, at least part of the heat produced by the combustion in the sole flue 120 is conveyed downward to structural components below the flue 120.

Beneath the sole flue 120 is a castable slab 125. The slab 125, comprising concrete, a ceramic, or other castable refractory, can form a bottom floor of the sole flue 120 and support the oven 100. The slab 125 can have a width that is approximately equal to the width of the oven 100, or the slab 125 can extend the width of multiple ovens.

The oven 100 is supported by a foundation 130, for example comprising concrete. The foundation 130 can be constructed on underlying subgrade 135. Depending on location, the subgrade 135 may include any of a variety of soil, rock, slag, or other materials.

Between the foundation 130 and the castable slab 125 are one or more beams 140 that form a plurality of air gaps 142 between the foundation and slab. The beams 140 can extend a length of the oven from a first end to a second end. For example, the beams 140 can extend from the front door 108 to the rear door 109. Each beam 140 can be a continuous structure extending the length of the oven 100, or two or more beams 140 placed end-to-end can together extend the length of the oven. The air gaps 142 can similarly extend the length of the oven 100. The air gaps 142 can be open at a first end of the oven 100 and a second end of the oven 100 opposite the first end, allowing air movement through the gaps 142 and around the beams 140. The beams 140 comprise a structural material capable of supporting the oven 100 while leaving air gaps 142 below the castable slab 125. In some embodiments, the beams 140 are manufactured out of a metal, such as steel. Other configurations and uses of the beams 140 are described in U.S. patent application Ser. No. 16/729,219, filed Dec. 27, 2019, which claims the benefit of U.S. Provisional Patent Application No. 62/786, 325, filed Dec. 28, 2018, both of which are incorporated herein by reference in their entirety.

In various embodiments, the beams 140 can be between six inches and eighteen inches high (i.e., leaving a gap between the foundation 130 and the castable slab 125 that is between six and eighteen inches). For example, the beams 140 can have a height of eight inches or twelve inches. The height of the beams 140 may be selected based on material properties of the beams, as well as an amount of natural or forced air flow through the air gaps 142. For example, because taller beams allow more air to flow through the gaps 142 under natural airflow than shorter beams, taller beams can be used in circumstances where more natural cooling is desired. The beams 140 can have a distance between them that depends on structural capacity of each beam. The beams 140 may have uniform spacing under the ovens, or more beams can be placed under heavier components of the ovens while fewer beams are placed under lighter components. For example, the beams 140 can be closer together under the sidewalls 110 than they are under the sole flue 120. FIG. 1A illustrates an example of three beams 140 under each sidewall 140 and three beams 140 under the sole flue 120, but additional or fewer beams can be used.

Figure 2A:
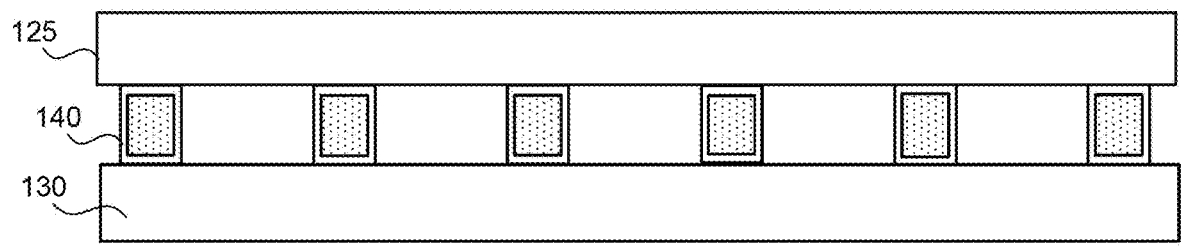
FIGS. 2A-2B illustrate example alternative beam shapes.
Figure 2B:
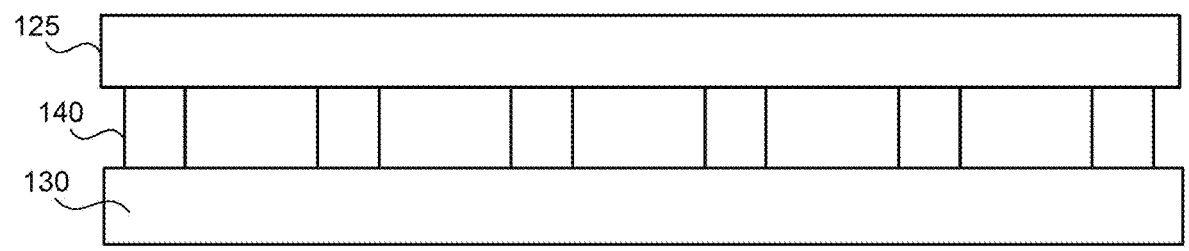

As shown in FIG. 1A, the beams 140 in some embodiments can comprise I-beams. However, the beams 140 can take other shapes or configurations in other embodiments. For example, the beams 140 can include a hollow pipe with a rectangular cross-section, as shown in FIG. 2A. In another example, as shown in FIG. 2B, the beams 140 can include a solid tube with a rectangular cross-section. In still other embodiments, the beams 140 can be a refractory, bricks, a combination of two or more of these structures (e.g., I-beams under some portions of the oven and bricks under other portions of the oven), or another structure that allows the beams 140 to be spaced apart from one another while supporting the weight of the oven 100 above the beams.

Figure 2C:
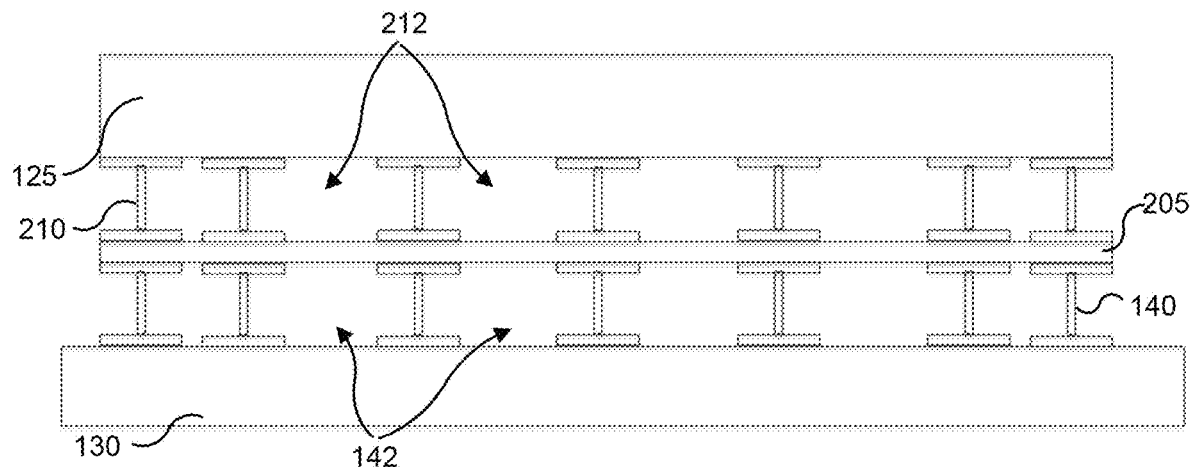
FIG. 2C is a schematic diagram illustrating an example of multi-layered beams.

As shown in FIG. 1A, the beams 140 can comprise a single layer between the castable slab 125 and the foundation 130. However, multiple layers of beams or beams and another material may be used instead of a single layer. FIG. 2C illustrates an example set of multi-layered beams. As shown in FIG. 2C, a second set of beams 210 can be positioned between the castable slab 125 and the foundation 130. The second set of beams 210 can form a second set of air gaps 212 between the castable slab 125 and the foundation 130 to thermally isolate the oven chamber 101 from the foundation 130. A second slab 205, including for example concrete or steel, can separate the first beams 140 from the second beams 210. The second beams 210 can in some embodiments have the same shape and approximate size as the first beams 140, as shown for example in FIG. 2C, and the oven 100 can include approximately the same number of second beams 210 as first beams 140. Alternatively, the second beams 210 can be shorter, taller, or wider than the first beams 140, can be a different shape than the first beams 140, or there can be additional or fewer second beams 210 than first beams 140. The second slab 205 can be omitted in some embodiments.

Figure 2D:
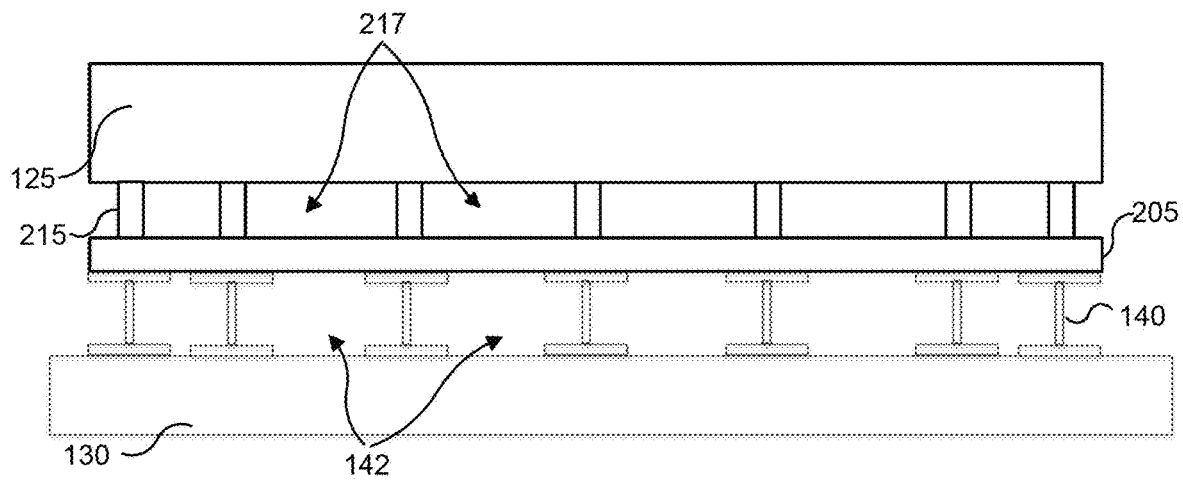
FIG. 2D is a schematic diagram illustrating an example of brick and metal beam layers.

FIG. 2D illustrates another example multi-layer air gap structure between the castable slab 125 and the foundation 130. In the example of FIG. 2D, there is one layer including a set of first beams 140 and a second layer that includes a set of bricks 215. The bricks 215 can form a second set of air gaps 217 between the castable slab 125 and the foundation 130 to thermally isolate the oven chamber 101 from the foundation 130. The layer of bricks 215 can be above the layer of beams 140 (as shown for example in FIG. 2D), or the layer of beams 140 can be above the layer of bricks 215. Each layer can have additional or fewer elements than shown in FIG. 2D. For example, although FIG. 2D shows a brick layer that has the same number of bricks 215 as there are beams 140 in the beam layer, the brick layer may have more bricks 215 than there are beams 140 or fewer bricks than beams. Furthermore, the oven 100 can include different configurations of a multi-layered foundation than shown. For example, the oven 100 can have a multiple brick or refractory layers with air gaps through one or more of the layers, or the oven 100 can include more layers than shown in FIGS. 2C-2D.

The beams 140 can dissipate heat from the oven 100, reducing the temperature of the castable slab 125 and reducing heat transfer between the sole flue 120 and the foundation 130. In some cases, the beams 140 can thermally isolate the oven 100 from the foundation 130. Because the slab 125, foundation 130, and/or beams 140 may fail at high temperatures and experience creep deformation at intermediate temperatures, the dissipation of heat helps reduce the likelihood of failure of either component. Similarly, heat transferred to the subgrade 135, in particular if the subgrade 135 includes a high proportion of slag, can cause the subgrade to become unstable. Reducing the heat transfer into the foundation 130 similarly reduces heat transfer to the subgrade 135 and reduces the likelihood of the subgrade 135 becoming unstable.

Figure 2E:
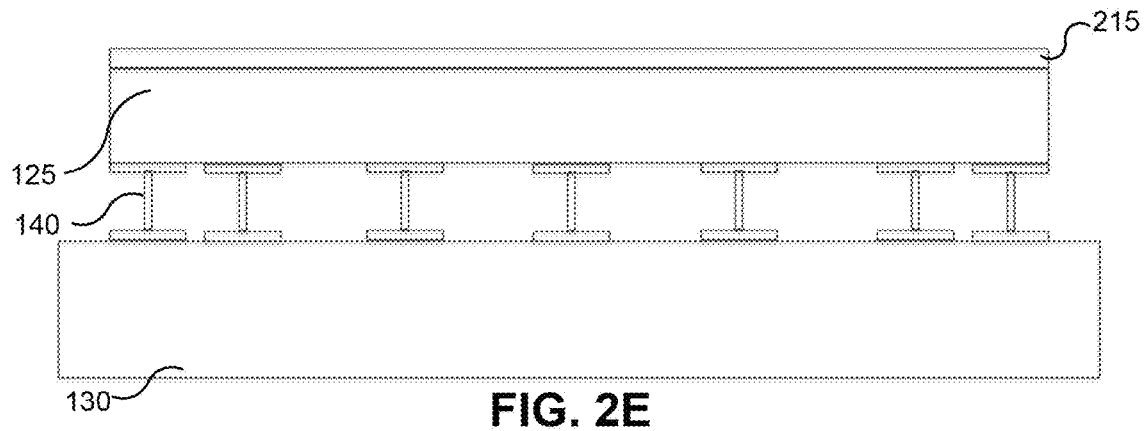
FIG. 2E is a schematic diagram illustrating an example insulating layer positioned on a top surface of a castable slab.

In some embodiments, the castable slab 125 can be at least partially encapsulated in an insulating material such as insulating fire brick. FIG. 2E is a schematic diagram illustrating an example insulating layer 250 positioned, by way of example, on a top surface of the slab 125 between the slab 125 and the sole flue 120. In other cases, the insulating layer 250 can be positioned on both a top side and a bottom side of the slab 125, or the insulating layer can surround all sides of the slab. A thickness of the insulating layer 250 can be less than a thickness of the slab 125. For example, one embodiment of the oven 100 includes a castable slab with a thickness of approximately fifteen inches and an insulating layer 250 with a thickness of approximately two inches. However, the thickness of the slab 125 and insulating layer 250 may be adjusted based on heat transfer or structural properties of the materials.

In embodiments in which the castable slab 125 is insulated from the sole flue 120 by an insulating material, the heat transfer between the sole flue 120 and the foundation 130 can be further reduced. This further reduction of heat transfer improves structural performance of the slab 125, foundation 130, subgrade 135, and beams 140, but also can increase the temperature in the oven 100 due to less environmental heat loss. An increased oven temperature increases the speed at which the coal cokes out, creating a more efficient coking process.

Multiple layers of material can be used to partially encapsulate the castable slab 125, rather than the single layer shown in FIG. 2E. For example, the castable slab 125 may be at least partially encapsulated in a micro-porous material, a sealant, or another material before being at least partially encapsulated in the insulating layer 250. Various examples of materials that can at least partially encapsulate the castable slab 125 are described in U.S. Provisional Patent Application Entitled Systems and Methods for Treating a Surface of a Coke Plant, filed concurrently on Dec. 28, 2018, which is incorporated herein by reference in its entirety.

Figure 3:
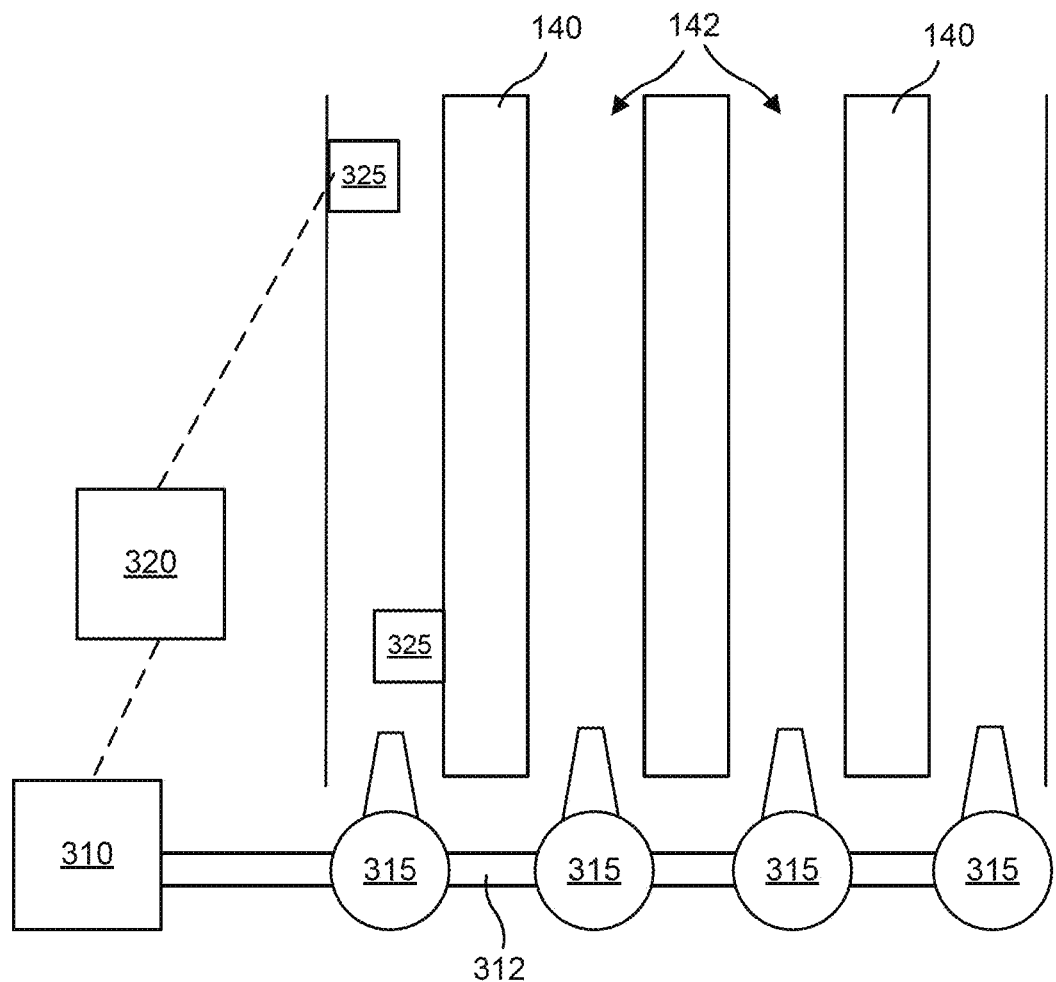
FIG. 3 illustrates a forced cooling system.

The air gaps 142 created by the beams 140 enable air to flow around the beams 140 to reduce heat transfer between the slab 125 and the foundation and the cool the beams. Depending on a location of the oven 100, natural air flow through the air gaps 142 (e.g., due to wind or due to pressure differentials created by heating of air in the gaps 142) may be sufficient to cool the beams. In particular, this natural airflow may be sufficient when the beams are taller. However, in some embodiments, the oven 100 includes a forced cooling system that forces a fluid through at least one of the air gaps 142 between the beams 140 to increase convection and further reduce the amount of heat transfer from the sole flue 120 to the foundation 130. FIG. 3 illustrates one embodiment of a forced cooling system 300 that forces air through the air gaps 142. If natural airflow through the gaps 142 is insufficient to cool the beams, or if the gaps 142 become obstructed by either debris from degradation of the slab 125 or beams 140, or coal or coke lost during transfer, the forced cooling system 300 can improve the heat transfer from the beams 140. The system 300 can in some embodiments include a fan 310, a plurality of valves 315, and a controller 320. FIG. 3 illustrates the cooling system 300 in association with a top view of air gaps 142 formed by the beams 140. Conventional components that may be used in the forced cooling system 300, such as additional valves, flow regulators, or the like, are omitted from FIG. 3 for simplicity.

The fan 310 forces air into a common pipe 312, and the valves 315 regulate airflow from the common pipe 312 into the air gaps 142. Each valve 315 can be placed at an opening of an air gap 142. When open, the valve 315 allows air from the common pipe 312 to pass through a nozzle into the air gap 142 to blow air through the gap and out an opening on the opposite side of the oven 100. In some embodiments, each valve 315 corresponds to one air gap 142, such that the valve 315 regulates an amount of air pushed into the one air gap 142 and each air gap 142 has a valve 315 pushing air through it. In other embodiments, a valve 315 may regulate airflow through multiple air gaps 142, or only a portion of the air gaps 142 may be cooled by the forced cooling system 300. For example, a valve 315 may be placed at the opening of every other air gap 142 rather than every air gap 142. Other embodiments can include more than one fan 310, such as a fan for each air gap 142 or a fan for each oven. Depending on the configuration, the multiple fans 310 can be electric fans. Furthermore, instead of the common pipe 312, the forced cooling system can include a common duct, where a fluid pressure in the duct is lower than a fluid pressure in the pipe 212.

Other forced cooling devices may be used instead of or in addition to the fans 310. For example, any combination of air horns, air multipliers, or air movers can be used instead of or in addition to the fans 310. In some embodiments, rather than using fans to push air through the air gaps 142, the forced cooling system 300 may include vacuums positioned at openings of the air gaps 142 to pull air through the gaps. As another example, cooling pipes can be positioned in the air gaps 142, adjacent to the beams 140, or passing through the beams 140. A cooling fluid can be pumped through the pipes continuously or on a periodic basis to dissipate heat from the beams 140.

The controller 320 provides control signals to the fan 310 and/or valves 315 to control the output from the respective component. The controller 320 may include any general or dedicated circuitry to generate the control signals and transmit the control signals to the fan 310 and valves 315, such as a processor, application-specific integrated circuit (ASIC), or a field programmable gate array (FPGA). The controller 320 can communicate with the fan 310 and valves 315 by wired or wireless communication.

In some embodiments, the controller 320 generates control signals to control the fan 310 and/or valves 315 based on feedback received from one or more sensors positioned in the air gaps 142. Each sensor can measure a property of a component of the oven 100 or surrounding area, such as a property of a beam 140, the castable slab 125, or the foundation 130. FIG. 3 shows an example of temperature sensors 325 attached to beams 140 that are configured to measure a temperature of the attached beam. The controller 320 can receive temperature signals from the temperature sensors 325. The controller 320 can apply a set of rules or one or more algorithms to the received temperatures to determine an amount of air to be pushed through the air gaps 142 to maintain the beam temperature within a specified range. The control signal can be generated to cause the cooling system 300 to push the determined amount of air through the gaps 142. In various embodiments, the control signal can cause the fan 310 to turn on or turn off, or to increase or decrease the volume of air the fan 310 pushes into the common pipe 312. Alternatively, the control signal can cause a valve 315 to open or close or to allow different volumes of air into the gaps 142.

Different types of sensors can be used instead of or in addition to the temperature sensors 325, such as air velocity sensors or strain sensors to measure expansion and contraction or changes in structure of the beams 140. Furthermore, additional or fewer sensors can be used to measure properties of the air gaps 142 or beams 140.

In some cases, the forced cooling system can be used when a temperature of a limiting material exceeds a temperature limit for the material. Each material used in the oven 100 and the surrounding area can have a respective temperature limit, which can be defined as a temperature at which the material will start to fail or a temperature that, if sustained long term, will result in failure of the material over the long term. By way of example, if the beams 140 are constructed from steel, the beams 140 can have a short term failure temperature of approximately 900° F. (e.g., a temperature at which the beams 140 immediately begin to fail). The beams 140 can experience long term failure if the temperatures of the beams remain at approximately 600-700° F. for a threshold length of time (e.g., experiencing creep failure). The limiting temperature of the beams can be defined as either the long-term failure temperature or the short-term failure temperature. Silica alumina, which can be used to make the castable slab 125, can have a limiting temperature of approximately 2800° F. If the bricks 215 comprise silica brick, the bricks 215 can have a limiting temperature of approximately 3000° F., while bricks 215 comprising fire bricks can have a limiting temperature of approximately 900° F. The foundation 130 may have a limiting temperature of approximately 400-600° F.

In some embodiments, the controller 320 activates the forced cooling system in response to a temperature of the limiting material, as detected by a sensor 325, exceeding a threshold temperature. The threshold temperature can be the temperature limit for the material or a temperature below the temperature limit defined such that the temperature limit is not exceeded.

In other embodiments, the forced cooling system can be installed for ovens 100 that are likely to have a limiting material exceed its temperature limit. The forced cooling system can be determined to be necessary before the oven 100 is constructed (e.g., based on modeling of the oven prior to construction) or after the oven 100 has been constructed (e.g., based on temperature measurements taken during operation of the oven).

The limiting material can be selected based on the limiting temperatures of the various materials used in the oven, the structure of the oven, the shape of the ground or other structures surrounding the base of the oven, weather patterns in the area where the oven is built, or other factors that may influence the temperature of the various structures in the oven. For example, if the beams 140 are likely to exceed their respective limiting temperature but the foundation 130 is not likely to exceed its limiting temperature, the beams 140 may be selected as the limiting material. As another example, the material with the lowest limiting temperature may be selected as the limiting material.

The forced cooling system shown in FIG. 3 can be used in single-layer air gap configurations (such as that shown in FIG. 1A) or in multi-layer configurations (such as that shown in FIG. 2A or FIG. 2D). When used in multi-layer configurations, the forced cooling system can be implemented to force a fluid through one or more layers of air gaps. For example, the forced cooling system can force air through all layers of air gaps or a subset of the layers.

Figure 4:
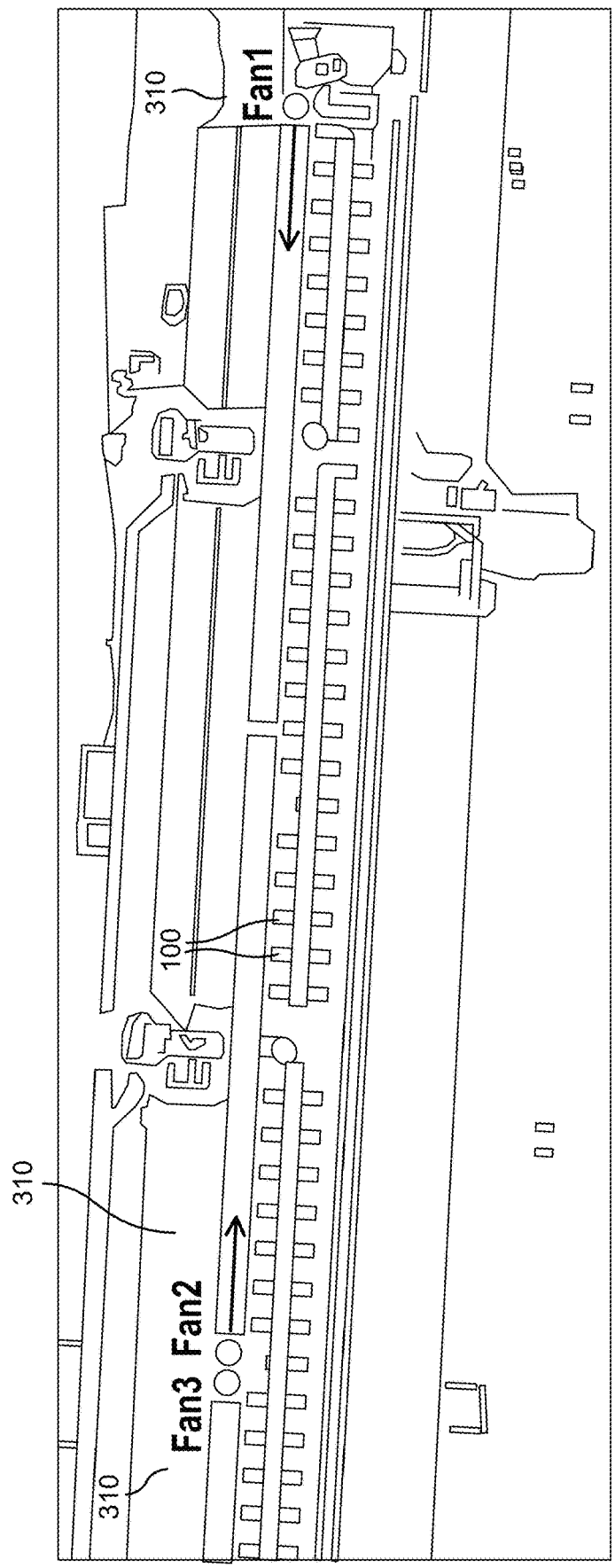
FIG. 4 illustrates example fan placement in a coke plant.

In some embodiments, the fan 310 can drive airflow for multiple ovens 100. FIG. 4 illustrates fan placement in an example coke plant that includes a row of adjacent ovens 100. Three fans 310 are shown in FIG. 4. Each fan 310 can blow air into a common pipe 312 that provides cooling for the air gaps 142 associated with multiple ovens 100. In the example of FIG. 4, each fan 310 supplies air for sixteen or seventeen ovens 100. However, the fans may supply air for additional or fewer ovens than shown in FIG. 4.

Instead of blowing air into the air gaps 142, various embodiments of the cooling system 300 can force different gases or liquids through the gaps. For example, in place of a fan 310, some embodiments of the cooling system 300 can include a pump to pump water or another liquid through the gaps 142. Alternatively, a compressor that can force a gas, such as nitrogen, through the gaps can be used in place of the fan 310.

In some embodiments, the air forced through the air gaps 142 can be returned to the oven 100 for use during the cokemaking process. Because heat is transferred into the air forced through the gaps 142, the air can be preheated before being used in the oven for combustion. This improves efficiency of the cokemaking process.

Figure 5:
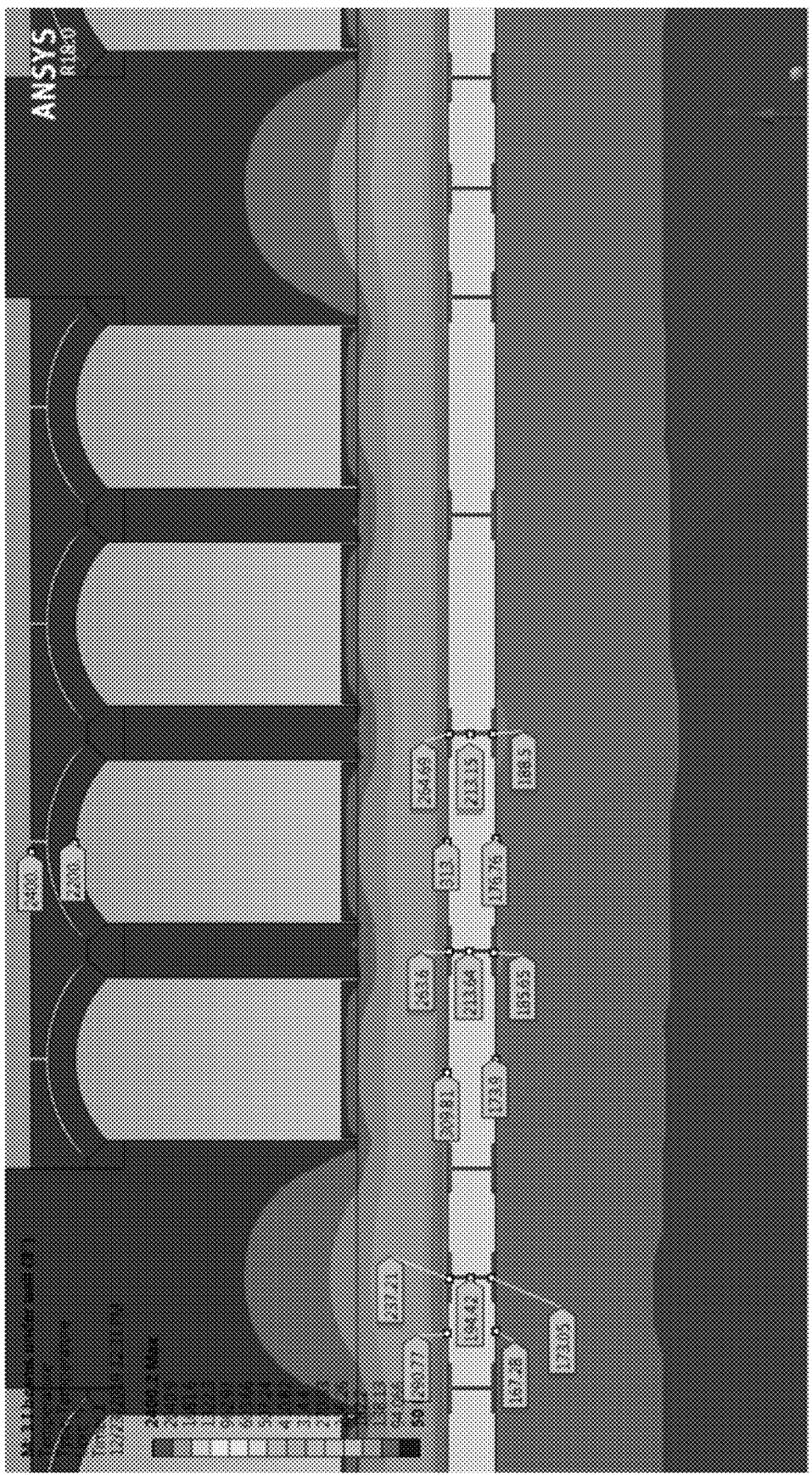
FIGS. 5-11 illustrate example modeling of temperature distributions within the heat recovery oven under various natural- and forced-cooling parameters.
Figure 6:
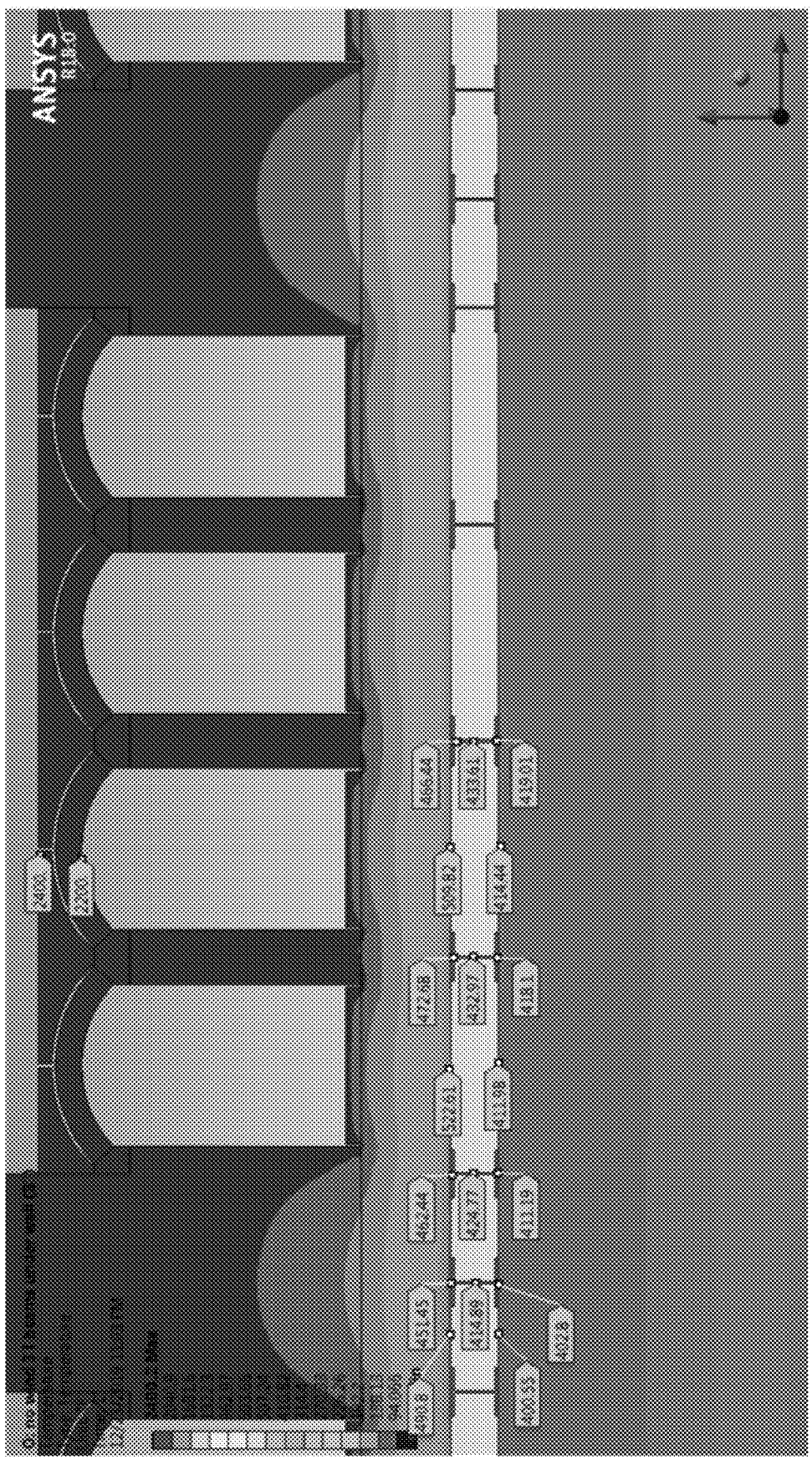

FIGS. 5-11 illustrate example modeling of temperature distributions within the heat recovery oven under different natural- and forced-cooling parameters. FIG. 5 illustrates temperatures under natural airflow (i.e., no fluid forced through the air gaps 142) with clean, unobstructed beams 140 that are 8 inches tall. The model shown in FIG. 5 has three beams 140 under the sidewalls 110 and three beams under the oven body. As shown in FIG. 5, beams 140 near a center of the oven 100 can reach slightly higher temperatures than beams under the sidewalls 110. FIG. 6 illustrates temperatures under similar conditions, but with an ambient temperature of 300 F instead of 120 F as shown in FIG. 5.

Figure 7:
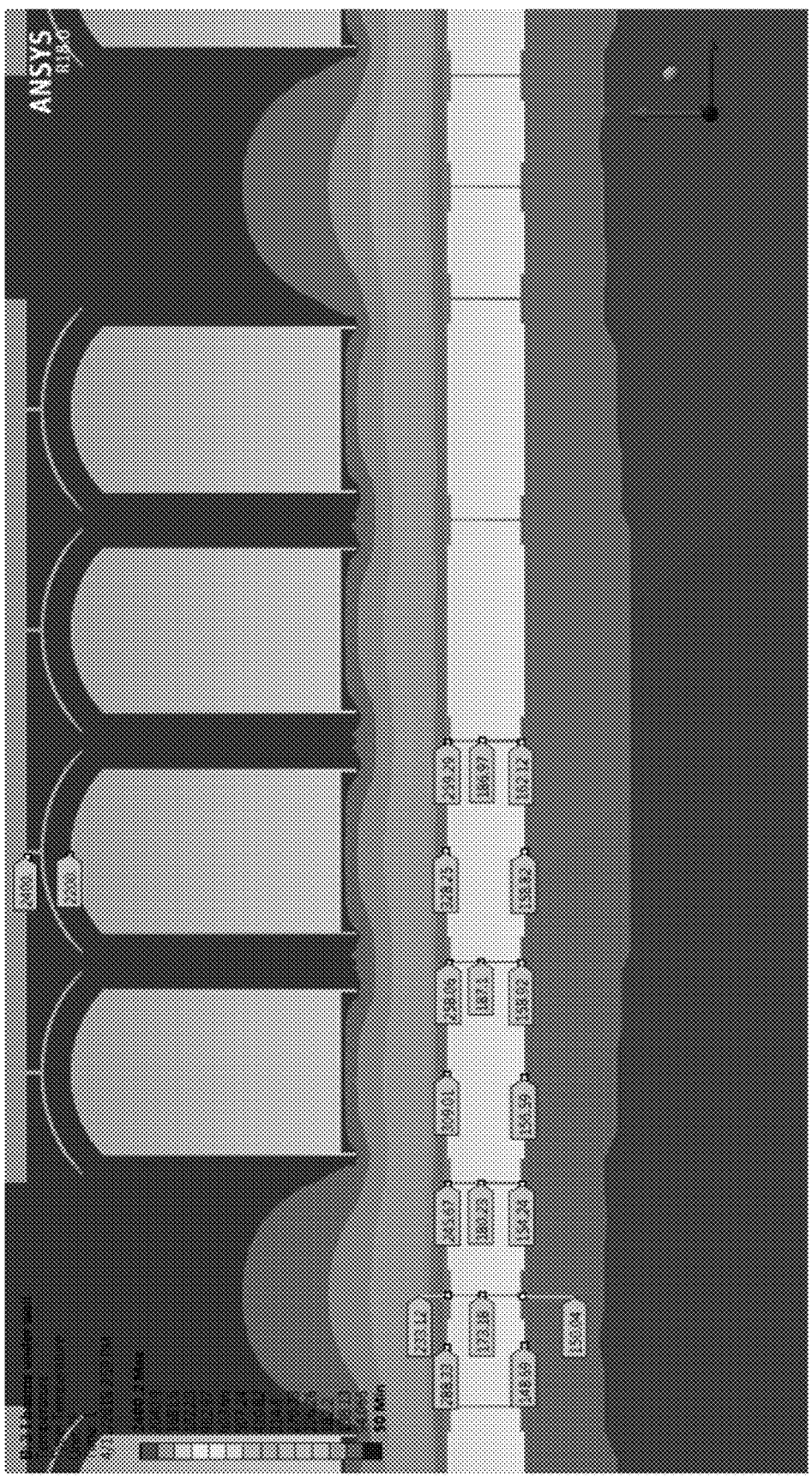
Figure 8:
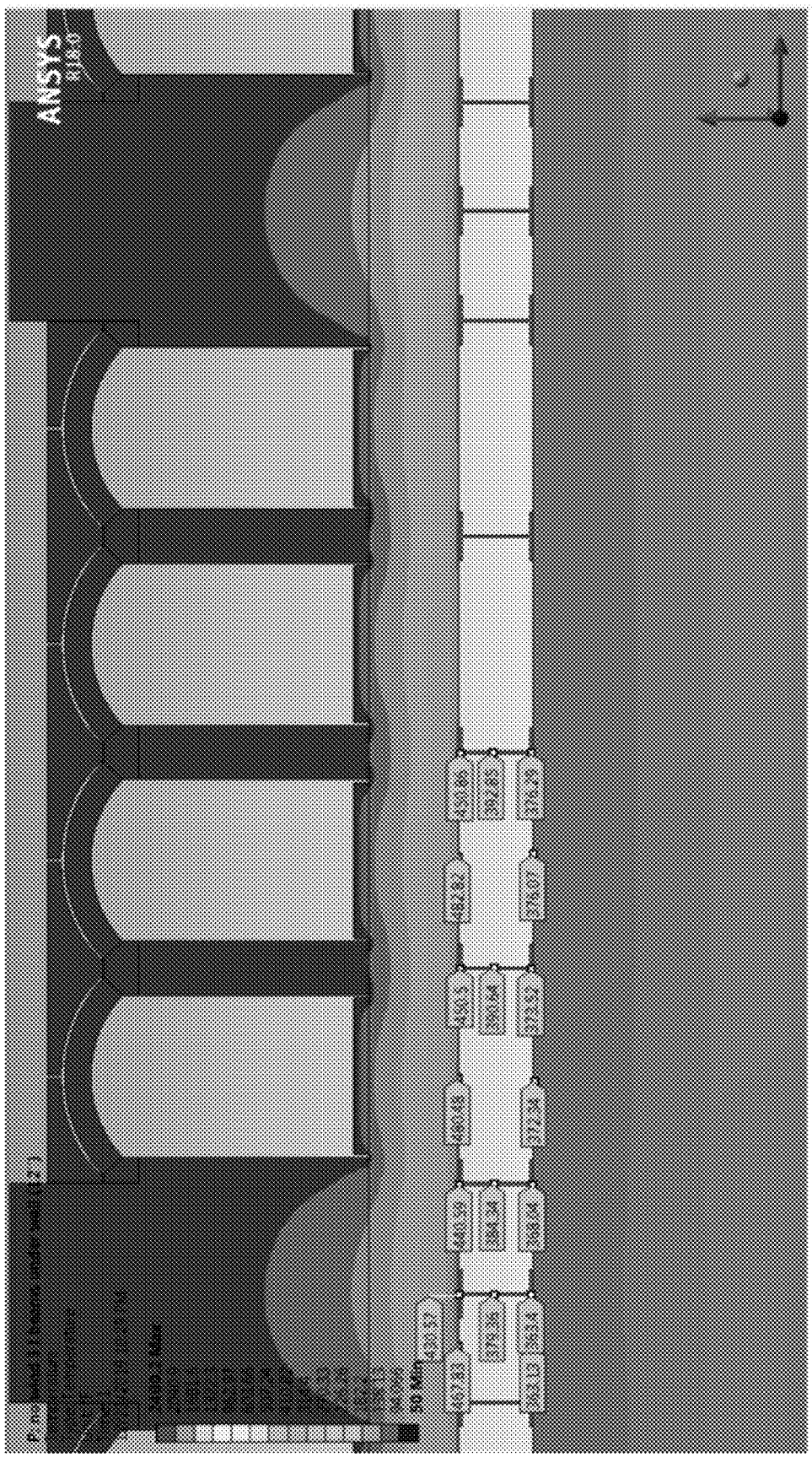

FIG. 7 illustrates example temperature distributions under conditions identical to those in FIG. 5, but in an oven system having beams 140 that are 12 inches tall. As shown in FIGS. 5 and 7, temperatures of the 12-inch beams are lower than temperatures of the 8-inch beams under otherwise identical conditions. FIG. 8 illustrates temperatures under similar conditions to those shown in FIG. 7, but with an ambient temperature of 300 F instead of 120 F as in FIG. 7.

Figure 9:
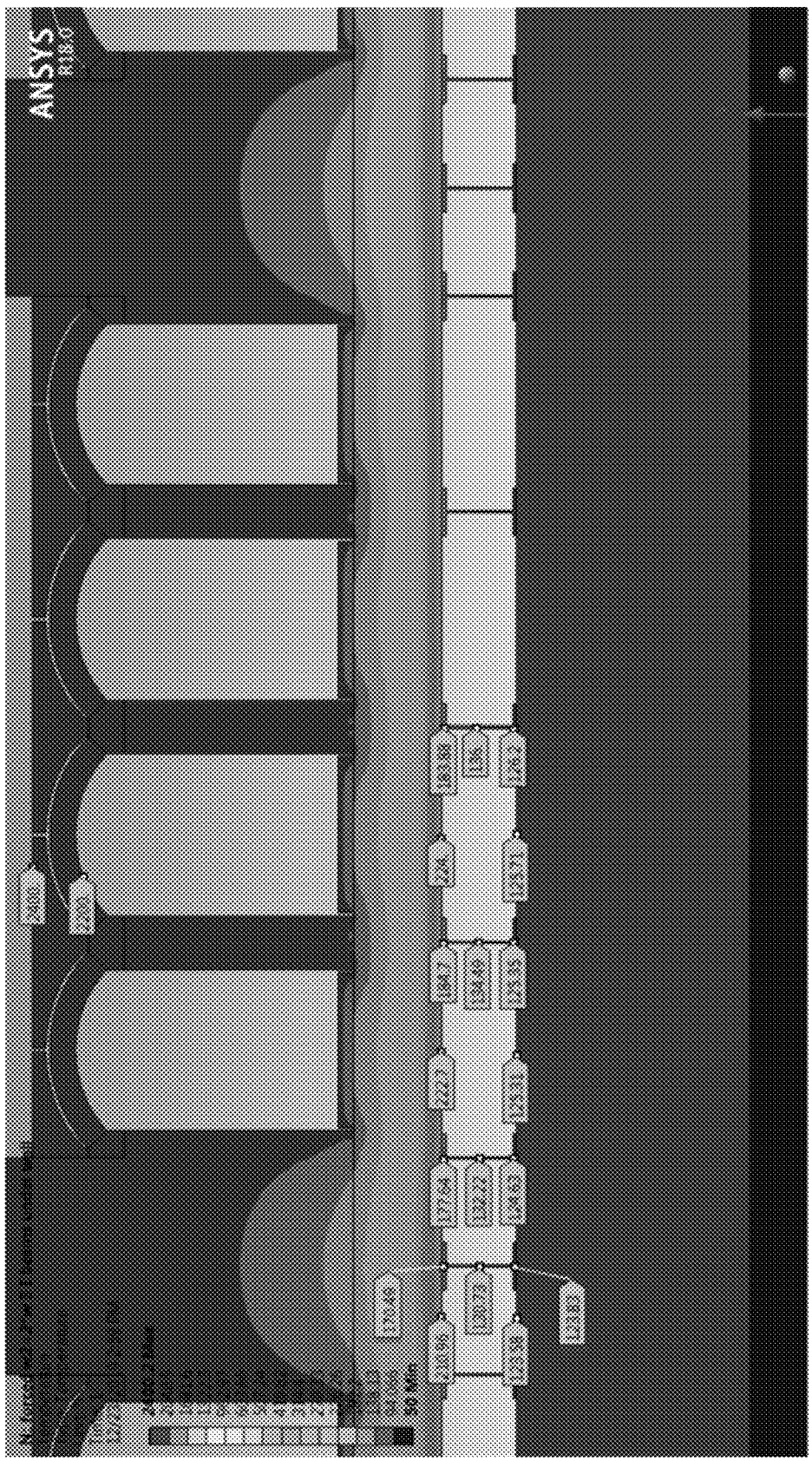

FIG. 9 illustrates the effect of forced air through the air gaps 142. The system modeled in FIG. 9 is similar to the system shown in FIG. 7, with 12-inch beams and an ambient air temperature of 120 F. However, the air speed through the air gaps 142 is five times higher than the ambient air speed modeled in FIG. 7. As shown in FIG. 9, the increased airflow can significantly reduce the temperatures of the beams 140, the bottom of the castable slab 125, and the foundation 130.

Figure 10:
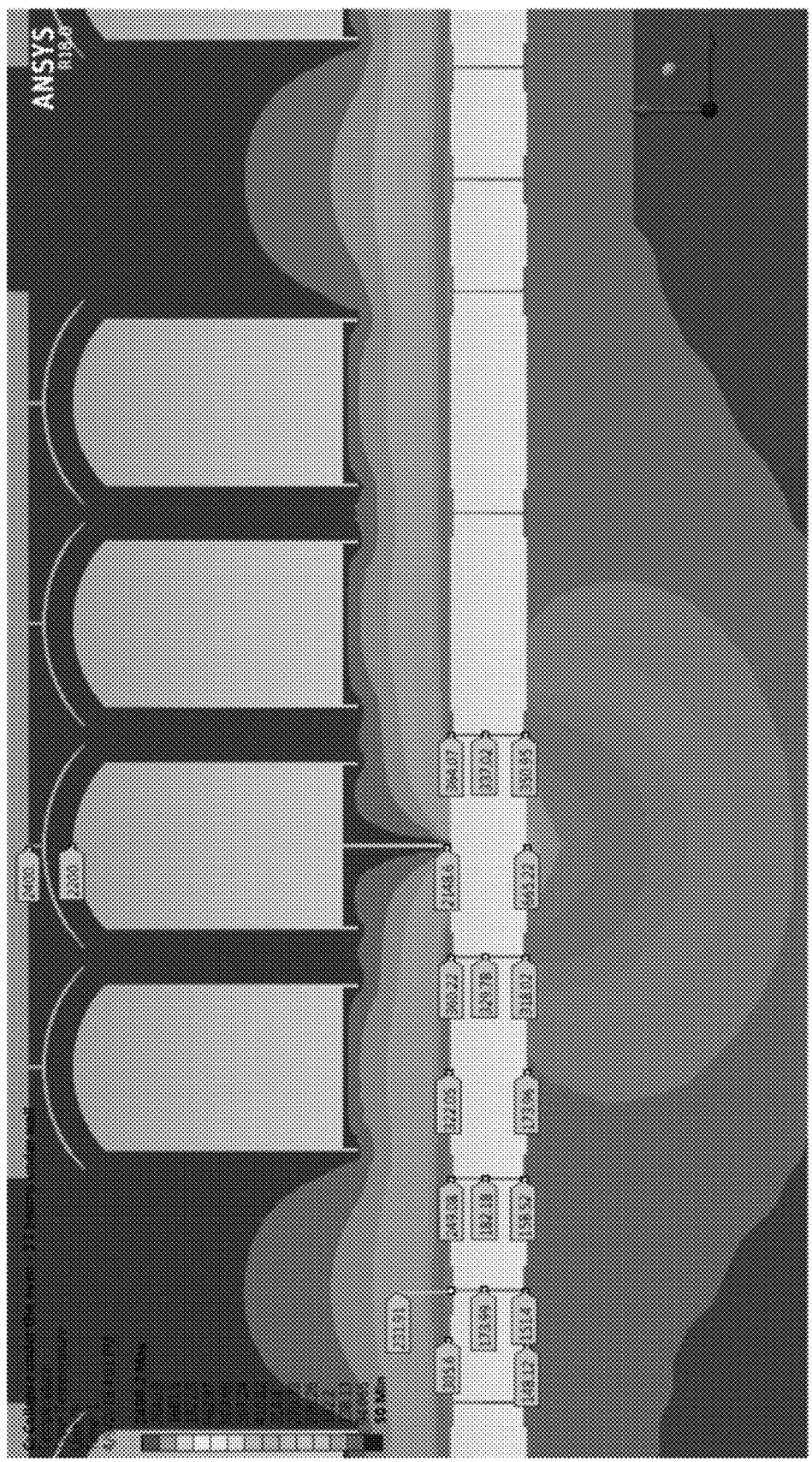

FIG. 10 illustrates example temperature distributions if there is a crack in the floor of the sole flue. The beams 140 modeled in FIG. 10 are 12 inches high, the ambient temperature is 120 F, and there is moderate wind speed. As shown in FIG. 10, the crack can cause increased temperatures under the oven.

Figure 11:
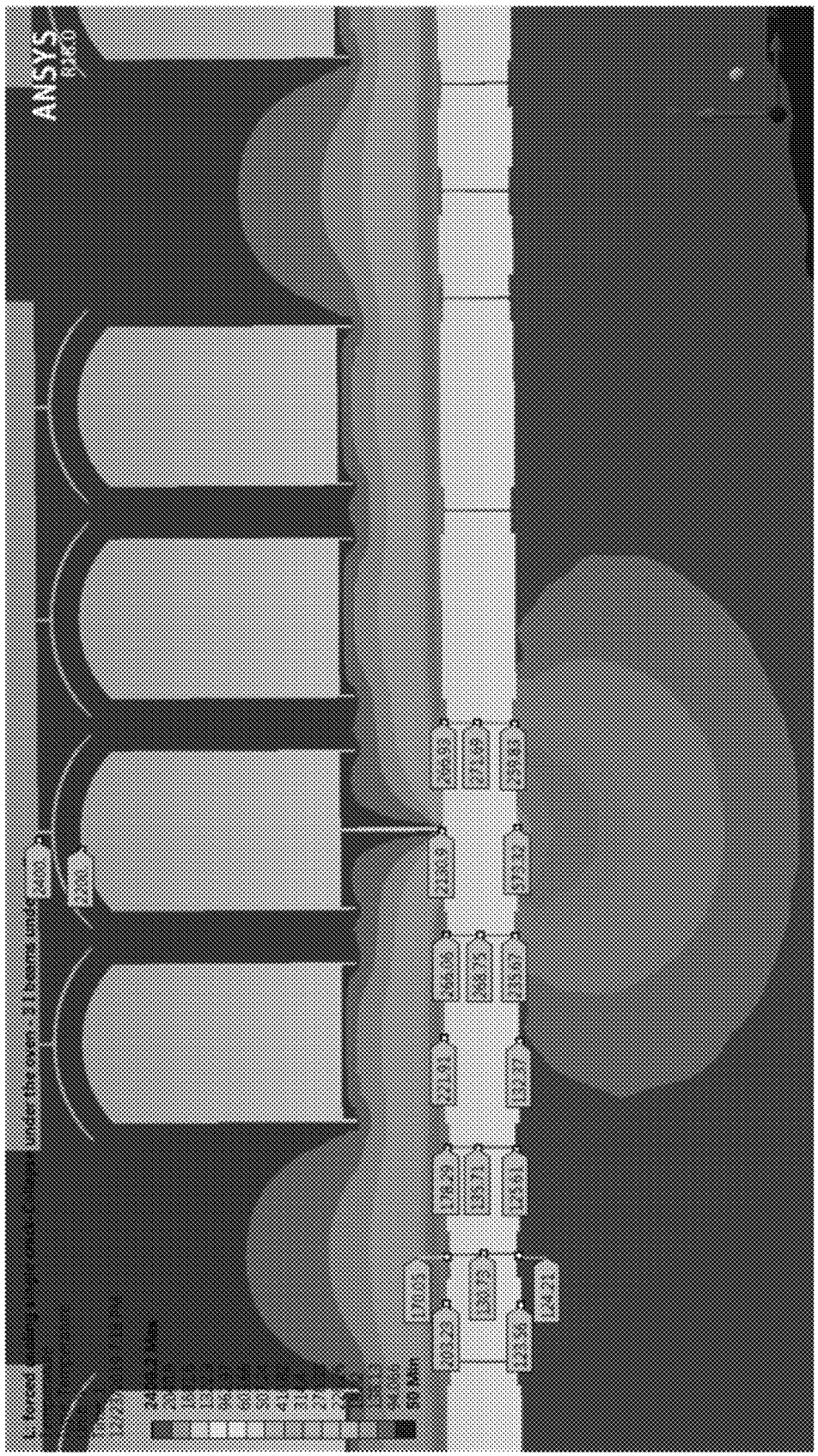

FIG. 11 illustrates the same cracked oven shown in FIG. 10, but with forced air applied to cool the air gaps. The forced air modeled in FIG. 11 has a velocity that is five times the velocity of the air modeled in FIG. 10. As shown in FIG. 11, the forced air can cool the components of the oven, mitigating the effects of the crack.

From the foregoing it will be appreciated that, although specific embodiments of the technology have been described herein for purposes of illustration, various modifications may be made without deviating from the spirit and scope of the technology. For example, while certain embodiments have been described as being sidewall, door, or crown air inlets/distributors, these inlets/distributors can be placed at any suitable location in the coke oven. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A method comprising:
providing a coke oven including an oven chamber, a foundation supporting the oven chamber and separated from the oven chamber by one or more air gaps, and a forced cooling system configured to force a fluid through an air gap of the one or more air gaps;
heating a coal bed in the oven chamber;
receiving an indication that a temperature of a limiting material of the coke oven exceeds a temperature limit, and
after receiving the indication and while heating the coal bed in the oven chamber, activating the forced cooling system to force the fluid through the air gap.

2. The method of claim 1, wherein the forced cooling system comprises a fan, the fan configured to push air into the air gap to drive the air through the air gap.

3. The method of claim 1, wherein the coke oven further comprises a sensor positioned in the air gap and a controller communicatively coupled to the sensor and the forced cooling system, and wherein the method further comprises:
detecting, using the sensor, the temperature of the limiting material; and
activating, by the controller, the forced cooling system to regulate an amount of the fluid that is forced through the air gap based on the temperature detected by the sensor.

4. A method for cooling a coke oven foundation, the method comprising:
providing a coke oven system including an oven chamber, a foundation supporting the oven chamber and separated from the oven chamber by one or more air gaps, a sensor in at least one of the air gaps, a forced cooling system, and a controller operatively coupled to the sensor and the forced cooling system;
heating a coal bed in the oven chamber;
receiving an indication from the sensor; and
based at least in part on the received indication, causing the forced cooling system to provide a fluid directed toward an air gap of the one or more air gaps.

5. The method of claim 4, wherein the forced cooling system comprises a fan operatively coupled to the controller, and a valve fluidically coupled to the fan and operatively coupled to the controller, and wherein the fluid is provided via the fan toward the air gap.

6. The method of claim 4, wherein the coke oven system includes beams between the foundation and the oven chamber, the beams extending from a first area below a first end portion of the coke oven toward a second area below a second end portion of the coke oven, wherein adjacent ones of the beams at least partially define the one or more air gaps, and wherein causing the forced cooling system to provide the fluid comprises causing the forced cooling system to provide the fluid between the adjacent ones of the beams.

7. The method of claim 4, further comprising heating the coal bed in the oven chamber while causing the forced cooling system to provide the fluid.

8. The method of claim 4, further comprising initiating heating the coal bed in the oven chamber, and wherein causing the forced cooling system to provide a fluid occurs after initiating heating the coal bed.

9. The method of claim 4, wherein the sensor is a temperature sensor.

10. A method for providing a cooling fluid, the method comprising:
operatively coupling a controller to a forced cooling system including a fan, and a valve operatively coupled to the fan via a common pipe;
receiving an indication from a sensor operatively coupled to the controller; and
based on the received indication, causing, via the controller, the forced cooling system to activate the fan and actuate the valve, thereby causing a cooling fluid to be directed to an air gap between two beams positioned between a foundation and an oven chamber of a coke oven.

11. The method of claim 10, further comprising heating a coal bed in the oven chamber while causing the forced cooling system to activate the fan.

12. The method of claim 10, further comprising initiating heating a coal bed in the oven chamber, and wherein causing the forced cooling system to activate the fan occurs after initiating heating the coal bed.

13. The method of claim 10, further comprising:
heating a coal bed in the oven chamber.

14. The method of claim 10, wherein the sensor is a temperature sensor.

* * * * *